United States Patent
Enders et al.

(10) Patent No.: US 7,268,444 B2
(45) Date of Patent: Sep. 11, 2007

(54) FEED LINE STRUCTURE

(75) Inventors: Thorsten Enders, Illingen (DE);
Juergen Schirmer, Heidelberg (DE);
Frank Stiegler, Ludwigsburg (DE);
Timo Kuehn, Oetigheim (DE); Klaus Dostert, Krickenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/531,961

(22) PCT Filed: Oct. 13, 2003

(86) PCT No.: PCT/DE03/03389

§ 371 (c)(1),
(2), (4) Date: Oct. 13, 2005

(87) PCT Pub. No.: WO2004/037613

PCT Pub. Date: May 6, 2004

(65) Prior Publication Data

US 2006/0103238 A1    May 18, 2006

(30) Foreign Application Priority Data

Oct. 19, 2002    (DE) .............................. 102 48 821

(51) Int. Cl.
*B60L 1/00*    (2006.01)

(52) U.S. Cl. ...................................... 307/10.1

(58) Field of Classification Search ............. 307/1,
307/10.1; 174/128.1; 375/257
See application file for complete search history.

(56) References Cited

U.S. PATENT DOCUMENTS

| | | | | |
|---|---|---|---|---|
| 3,300,682 A | * | 1/1967 | Frungel et al. | 315/171 |
| 3,973,227 A | * | 8/1976 | Erculiani | 333/246 |
| 4,077,022 A | * | 2/1978 | Pitts, Jr. | 333/1 |
| 4,268,957 A | * | 5/1981 | Sbuelz | 29/871 |
| 4,642,417 A | * | 2/1987 | Ruthrof et al. | 174/36 |
| 5,734,658 A | | 3/1998 | Petry et al. | |
| 5,745,027 A | * | 4/1998 | Malville | 375/259 |
| 5,804,892 A | * | 9/1998 | Schwan et al. | 307/104 |
| 6,005,304 A | * | 12/1999 | Seelig | 307/104 |

(Continued)

FOREIGN PATENT DOCUMENTS

DE    101 11 100    10/2002

(Continued)

OTHER PUBLICATIONS

Stiegler et al. *A Novel Supply Network Architecture For Powerline Communications in Automobiles*, Schiele & Schon GMBH, Berlin, Germany, vol. 56, No. 5/6, pp. 126-132.

*Primary Examiner*—Michael Sherry
*Assistant Examiner*—Daniel Cavallari
(74) *Attorney, Agent, or Firm*—Kenyon & Kenyon LLP

(57) ABSTRACT

A supply line structure for supplying energy to the electrical components of an automotive vehicle and for transmitting information between at least some of the electrical components, the supply lines being disposed, in particular in a star structure having at least one star point; in order to be able to transmit high supply currents, the supply line structure is configured in such a way that at least a part of the supply lines includes a coaxial arrangement of a plurality of outer litz wires about a central litz wire.

12 Claims, 5 Drawing Sheets

U.S. PATENT DOCUMENTS

| | | | |
|---|---|---|---|
| 6,249,060 B1 * | 6/2001 | Osha | 307/10.1 |
| 6,495,763 B1 * | 12/2002 | Eichmann et al. | 174/113 R |
| 6,577,230 B1 * | 6/2003 | Wendt et al. | 375/258 |
| 2002/0030249 A1 * | 3/2002 | Yoshida et al. | 257/659 |
| 2003/0052771 A1 * | 3/2003 | Enders et al. | 340/310.01 |

FOREIGN PATENT DOCUMENTS

| | | |
|---|---|---|
| DE | 101 42 410 | 4/2003 |
| EP | 0 844 697 | 5/1998 |
| JP | 10040745 A * | 2/1998 |

* cited by examiner

FEED LINE STRUCTURE

FIELD OF THE INVENTION

The present invention relates to a supply line structure for supplying energy to the electrical components of an automotive vehicle and for transmitting information between at least some of the electrical components, the supply lines preferably being arranged in a star structure having at least one star point.

BACKGROUND INFORMATION

A supply line structure is described in non-prepublished German Patent Application No. 101 42 410 filed by the applicants.

A supply line structure of this type is intended to support communication between various electrical components, for example between a door control unit and a seat control unit, and also to supply energy to these components. This approach is referred to as power line communications. Here it has been found to be useful to restructure the wiring harness that is already present in the existing technology in such a way that the supply lines are arranged in a star structure having at least one star point. In the known supply line structure, the use of so-called twisted pair cables to supply power to the components has proven to be advantageous. These cables are understood to mean double cores or conductor litz wires that are twisted together and that result in an improvement in interference immunity and that have various characteristic impedances that are a function of the degree of twisting that is carried out. Since a star point within a conductor system may always be regarded as a parallel connection of resistors, a very low impedance results for the star point, which, at the star point, leads to undesirable reflections of the wave propagating in a supply line branch in the direction of the star point. However, this effect may be suppressed by wiring of the line branch in the area of the star point, as proposed in the aforesaid German Patent Application No. 101 42 410.

A further problem with the supply line structure described above is, however, the transmission of high electrical currents. If the aforesaid twisted pair cables are used, their limited cross-sectional area, which makes them more practical to twist, imposes limits as to the current that may be carried. Moreover, it is expensive to manufacture twisted pair cables that have a large cross-sectional area.

SUMMARY OF THE INVENTION

Therefore, an object of the present invention is to also be able to transmit high supply currents with the supply line structures of the species.

Starting from the aforesaid supply line structure, this object is accomplished by the invention in that at least a portion of the supply lines includes a coaxial arrangement of a plurality of outer litz wires of the line disposed around a central litz wire of the line.

The present invention therefore proposes, in order to supply power to individual high-current consumers or to supply power to central distribution nodes—in other words star points within the supply line structure—that a coaxial arrangement of line litz wires be used to form the given section of the supply line. This results in a very large line cross-sectional area, which permits the transmission of high currents, even those well in excess of 10 A, to supply energy, something that would not be possible with individual twisted pair cables since the line cross-sectional areas required for this would no longer economically permit the line litz wires to be twisted together.

Selectivity, as well, may be accomplished, for example with the aid of a central fuse box, by using a coaxial arrangement of a plurality of outer litz wires about a central litz wire. This would require a plurality of twisted pair cables, which would then have, however, have to be installed in bundled form, which must be viewed as costly.

The arrangement proposed according to the present invention includes a plurality of outer litz wires, especially having the same cross-sectional area, and one central litz wire, referred to as the guide litz wire, around which the outer litz wires are disposed or wound. However it is also conceivable to use a litz wire having a larger cross-sectional area for the guide litz wire than in the case of the outer litz wires. Likewise, it is possible, in order to configure the guide litz wire, to use a plurality of litz wires, similar to a braided wire cable. It has been found to be advantageous when 5-10, more preferably 5-8, outer litz wires are provided around the central guide litz wire. In this regard, 6 outer litz wires have been found to be especially advantageous. Good empirical results were obtained with line litz wires having a cross-sectional area of 2-3 mm$^2$, in particular of approximately 2.5 mm$^2$.

In a further embodiment of the invention, it proves to be particularly important when the outer litz wires of the line are short-circuited relative to each other, preferably at both of their ends, via capacitors utilizing high-frequency technology. In this way, the resulting supply line section performs in the same way as a coaxial cable for HF data signals.

Since the central litz wire or the guide litz wire in the interior of the coaxial layout generally has a smaller cross-sectional area than the total of the cross-sectional areas of the outer litz wire, it has been found to be advantageous to be able to return direct-current components via the vehicle body when high current loads are being transmitted. For this purpose, it has been found to be advantageous to connect the central litz wire, preferably at both of its ends, to the vehicle body.

In this case, however, in-phase currents may be formed across the body in a disadvantageous manner. However, this may be advantageously counteracted by using an inductive coupling between the outer litz wires and the central litz wire. For this purpose, a ring-shaped core containing or made of ferritic material may be used and may simply be slid over the respective section of the supply line, so that the supply line passes through this annular core. In this way, a common mode coil is formed. In order to further increase the impedance for in-phase currents, it is possible to route the coaxial arrangement of line litz wires at least one time or more than one time about the annular core, so that the supply line forms one or more loops through and around the annular core.

It has been found that a characteristic impedance of the coaxial arrangement of line litz wires may reach 35-50 ohms, in particular around 40 ohms.

Using the supply line structure of the present invention, and with a line length of 5 m in the frequency range between 100 and 250 MHz, a transmission characteristic of −1.4 dB to −4.4 dB, advantageously from −1.9 dB to −3.7 dB, may be reached, which is to be considered especially suitable. Large currents are able to be transmitted.

In order to suppress the in-phase currents at transitions between the central litz wire and the vehicle body, or between the outer litz wires and further branches that in

DETAILED DESCRIPTION

Figure 1:
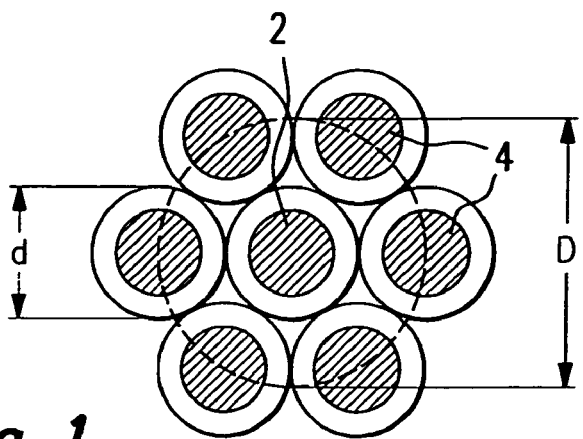
FIG. 1 shows a schematic representation of a coaxial arrangement of litz wires in a supply line.
Figure 8:
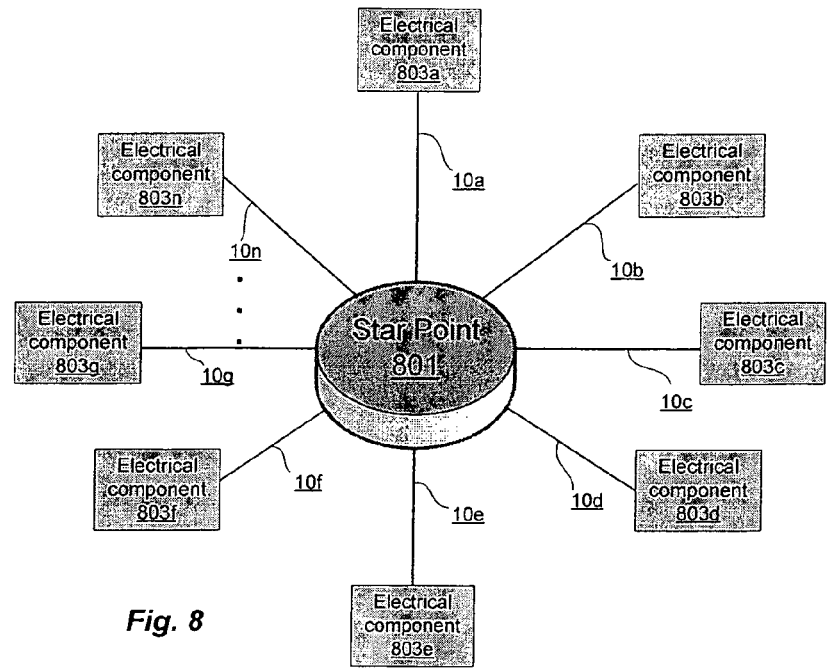
FIG. 8 shows a schematic representation of an arrangement of supply lines in a star network topology, according to an example embodiment of the present invention.

FIG. 1 shows a cross-sectional view through the coaxial arrangement according to the present invention of seven litz wires having the same cross-sectional area of 2.5 mm² each, six outer litz wires 4 being arranged around one central or guide litz wire 2. Dimension d is 1.78 mm, and dimension D is 6.8 mm. When this arrangement is used in a supply line structure to supply energy to the electrical components of an automotive vehicle and to transmit information between at least some of these electrical components, outer litz wires 4 are connected to a positive potential, and central litz wire 2 is connected to a negative potential. The six outer litz wires 4 are able to be individually protected at a central fuse box—for example in the engine compartment. The other end of this supply line according to the invention may be connected to a distributor box at a different central point in the automotive vehicle, for example beneath the rear seat. This central point then forms a star point in the supply line structure. For example. FIG. 8 shows the star point 801 formed by the central point in a star topology 800 that includes the supply lines 10a-n interconnecting the star point 801 to the other electrical components 803a-n.

Figure 2:
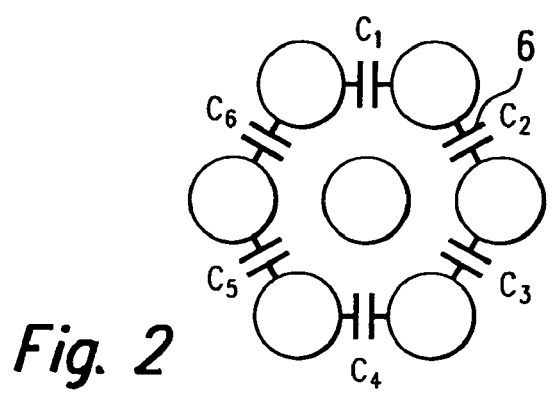
FIG. 2 shows a schematic representation of outer litz wires short-circuited using HF technology.

As shown in FIG. 2 and as is represented there schematically, outer litz wires 4 are short-circuited using HF technology with the aid of capacitors 6, preferably at both ends of the coaxial cable arrangement, so that the arrangement of the invention for forming a supply line for HF data signals behaves in a manner similar to that of a coaxial cable.

Figure 3A:
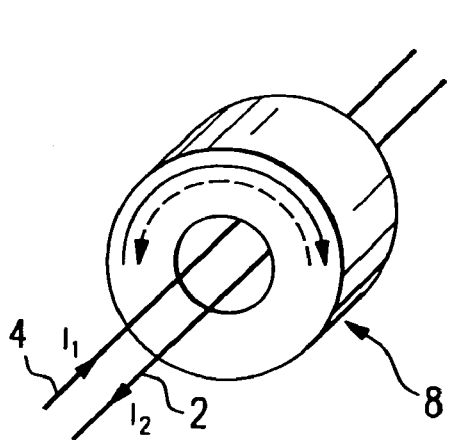
FIG. 3a: a schematic representation of the use of an annular ferrite core as a common mode coil.
Figure 3B:
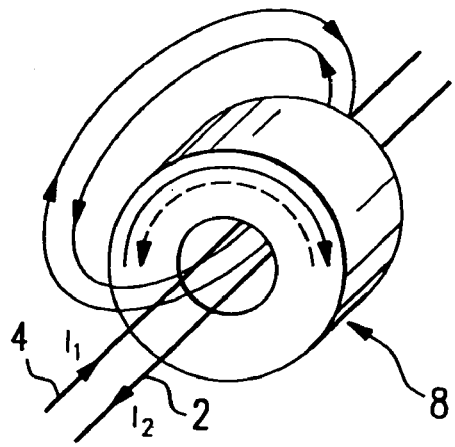
FIG. 3b: another schematic representation of the use of an annular ferrite core as a common mode coil.
Figure 9:
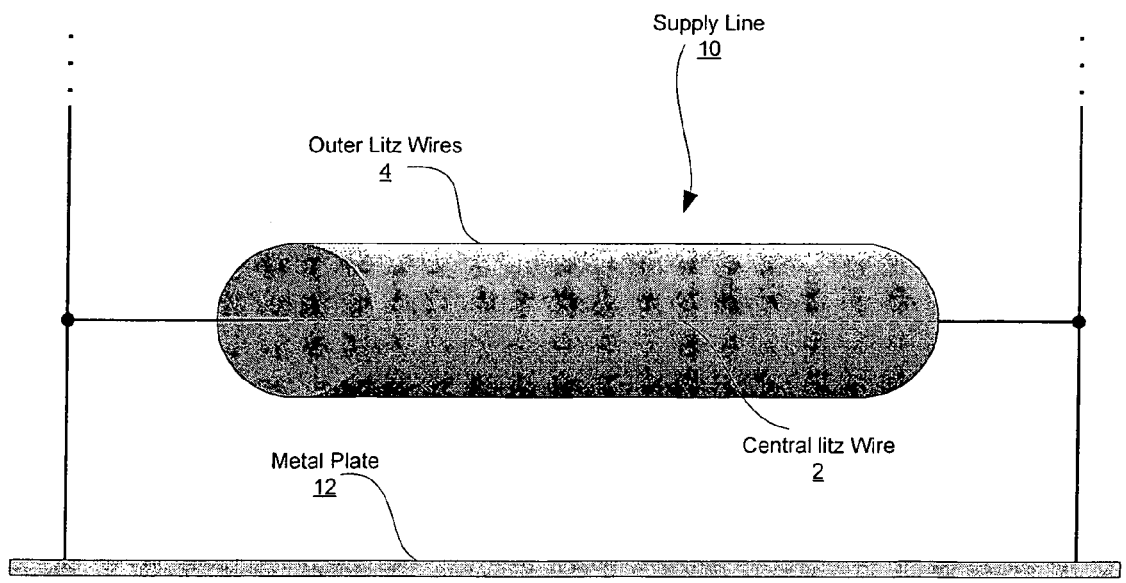
FIG. 9 shows a schematic representation of a connection of a section of a supply line at two of its ends to a metal plate (vehicle body), according to an example embodiment of the present invention.

In particular when high currents are being conducted, the problem of the feedback of the direct-current components arises. As indicated initially, it proves to be advantageous, particularly for high currents, to feed back the direct-current components through the vehicle body. For this purpose, both ends of central or guide litz wire 2 of the arrangement according to the invention are also connected to the vehicle body, as shown in FIG. 9, which provides a schematic representation of the connection of a section of a supply line 10 at two of its ends to a metal plate 12 representing the vehicle body. However, this causes in-phase currents to be present across the vehicle body. This effect is counteracted—as also described initially—by using an annular core containing or made of ferritic material. Such an annular core 8 is shown in FIG. 3a, one outer litz wire 4 that conducts a current $I_1$, as well as central litz wire 2 that conducts a current $I_2$ being represented schematically at the same time. Annular core 8 is simply slid over the coaxial arrangement of litz wires 2, 4, so that this coaxial arrangement, or the section of the given supply line that is configured in accordance with the invention, extends through annular core 8.

Figure 4:
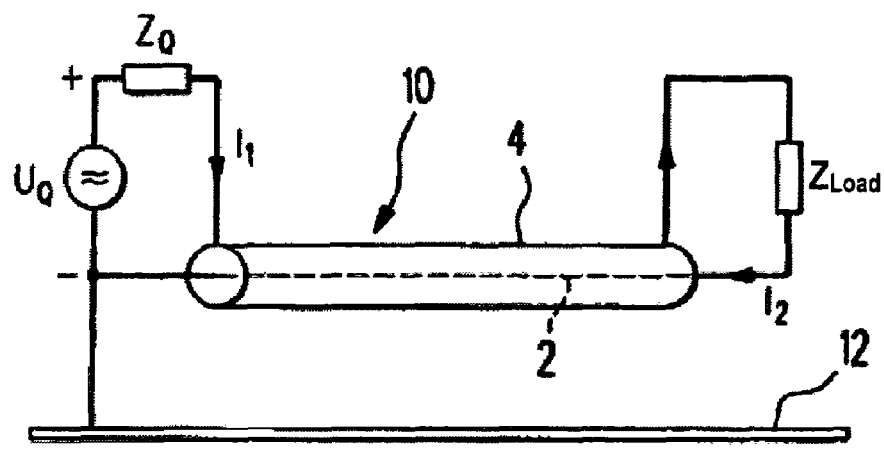
FIG. 4 shows a schematic representation of the connection of a section in accordance with the invention to a metal plate (vehicle body).
Figure 5:
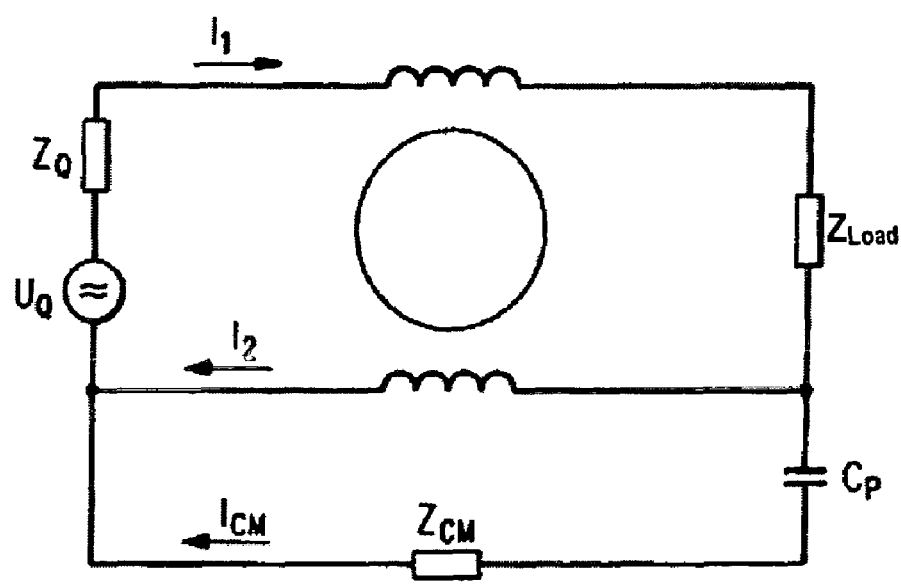
FIG. 5 shows an equivalent circuit diagram of the arrangement shown in FIG. 4 with a common mode coil.

To get a better idea of the effect of annular core 8, in other words the common-mode-coil coupling, refer to FIG. 4, which provides a schematic representation of the connection of a section of a supply line 10 in accordance with the invention to a generator $U_Q$ and a metal plate 12 representing the vehicle body. An equivalent circuit diagram is shown in FIG. 5.

Generator $U_Q$ is connected on the one side of supply line 10. On the other side of supply line 10, a load resistor $Z_{Load}$ is provided between outer litz wires 4 and central litz wire 2. If, in an unfavorable case, the potential at the inner conductor, i.e. central litz wire 2, is also connected to metal plate 12, the shielding of the coaxial cable formed in this manner—in other words outer litz wires 4—and metal plate 12 are therefore at different potentials. As a result of parasitic capacitances, which are represented in the equivalent circuit diagram in FIG. 5 as $C_P$, between the shielding and metal plate 12, a circuit is closed and an in-phase current flows. If on the generator side of supply line 10 an annular core 8 made of ferritic material is added, as described above, this in-phase current is able to be largely prevented, since the impedance $Z_{CM}$ of the common mode coil formed by annular core 8 significantly increases the original impedance of the circuit. In order to provide a better understanding of the conditions that are present, an HF approach is not used. Thus, for the equivalent circuit diagram shown in FIG. 5, it was assumed that the line length is "short" relative to the wavelength. Therefore, the equivalent circuit diagram may be prepared using discrete components.

Figure 6A:
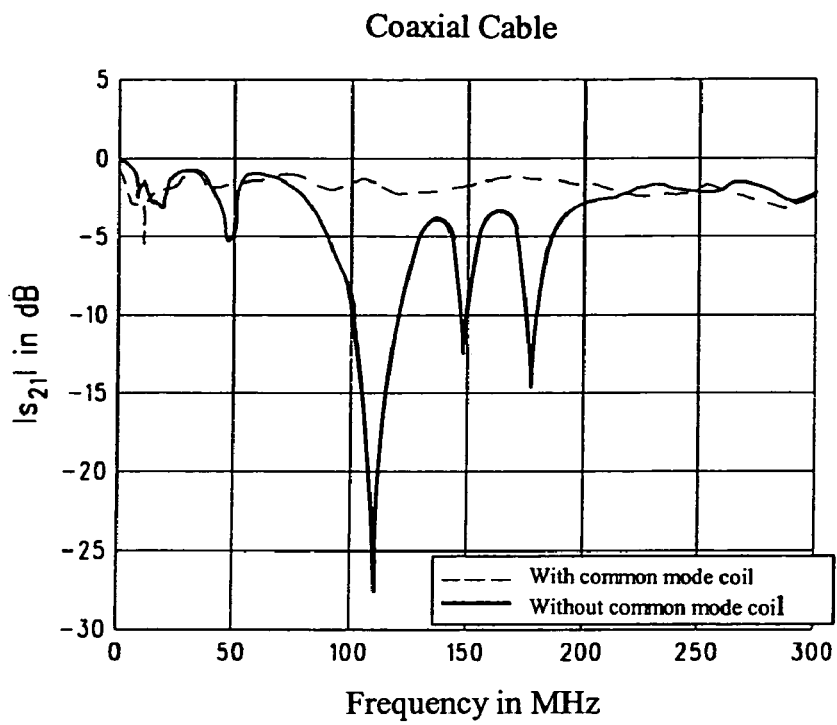
FIG. 6a: the transmission characteristic of a supply line according to the invention with and without a common mode coil.
Figure 6B:
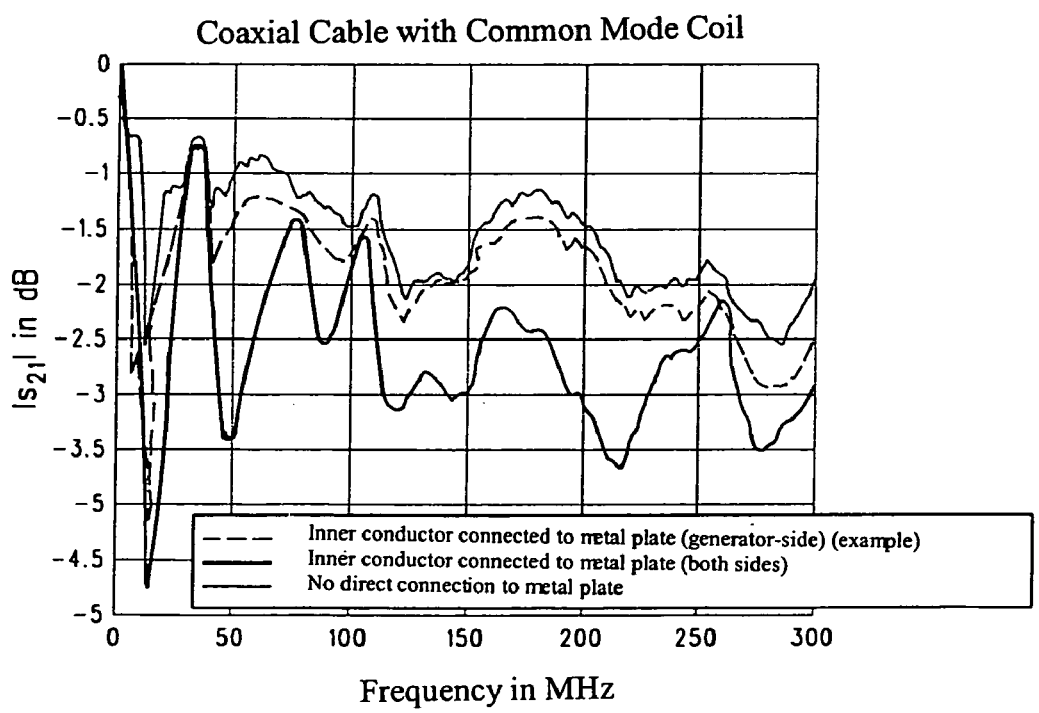
FIG. 6b: the transmission characteristic of a supply line according to the invention with and without a common mode coil, but shows measurements for various connections to a metal plate.

FIGS. 6a and 6b show the measurement results for the scenario under consideration when a 3-m-long supply line 10 is used. The measurement was performed in FIG. 6a for the case with inductive coupling and for the case without inductive coupling via an annular ferritic core.

Clear advantages are able to be seen when an annular core is used.

The chart shown in FIG. 6b shows measurements with various connections to metal plate 12. First, supply line 10 itself was measured by separating the connection to metal plate 12. Moreover, the condition of the connection of central litz wire 2 of supply line 10 both on the generator side as well as on the load side to metal plate 12 is shown. This actually represents the special case for $C_P|\square$, or a bridging of capacitor $C_P$. Here one use would be the additional direct-current path via the vehicle body, as already mentioned. Finally, for a direct comparison, one connection to metal plate 12 only on the generator side is represented. In this context, for all measurements, an annular core (common mode coil) was used on the generator side of supply line 10. The measurement results show that the curves differ from each other only by approximately 2 dB. Thus, an additional direct-current path via the vehicle body is definitely able to be implemented without producing any negative effects on the transmission characteristic of supply line section 10 within the supply line structure. With regard to the characteristic impedance In order to calculate the characteristic impedance of a coaxial line arrangement, the following equation is used:

$$Z_L = \frac{60\Omega}{\sqrt{\varepsilon_{r,Insulation}}} \cdot \ln\left(\frac{D}{d}\right)$$

$\varepsilon_{r,Insulation}$ is the dielectric constant of the insulation material being used. D and d may be seen in FIG. 1.

Since the cover or shielding of the coaxial line arrangement does not have a constant distance to the guide litz wire along its entire periphery, a mean diameter is used for D in Equation 1. When a PVC-insulated copper line having a cross-sectional area of 2.5 mm² according to the example depicted in FIG. 1 is used, having one guide litz wire and six peripheral litz wires, the impedance calculated according to Equation 1 is:

$$Z_{L,calculated} = 42.99 \Omega$$

where d=1.78 mm and D=6.8 mm.

Using measurement technology, a characteristic impedance of $$Z_{L,measured} \approx 40 \ \Omega$$

was obtained, thus confirming the equation stated above.

With regard to the damping factor

Corresponding to the relationships for a coaxial line arrangement, the damping factor resulting from the conductor losses $\alpha_L$ of a coaxial line arrangement may be approximated using the following equation:

$$\alpha_L = \sqrt{\frac{\mu_0 \cdot \mu_{r,conductor} \cdot \rho}{\pi}} \cdot \frac{1+\frac{D}{d}}{2 \cdot D \cdot Z_L} \cdot \sqrt{f}$$

The damping factor of the dielectric losses CD may be approximated in a manner analogous to the above procedure using the equation $$\alpha_D = \pi \cdot \sqrt{\varepsilon_{r,insulation}} \cdot \frac{\tan\delta}{c_0} \cdot f$$

With regard to the capacitance per unit length

The capacitance per unit length C of a coaxial line arrangement may be approximated using the following equation:

$$C = \frac{2 \cdot \pi \cdot \varepsilon_0 \cdot \varepsilon_{r,insulation}}{\ln\left(\frac{D}{d}\right)}$$

Figure 7:
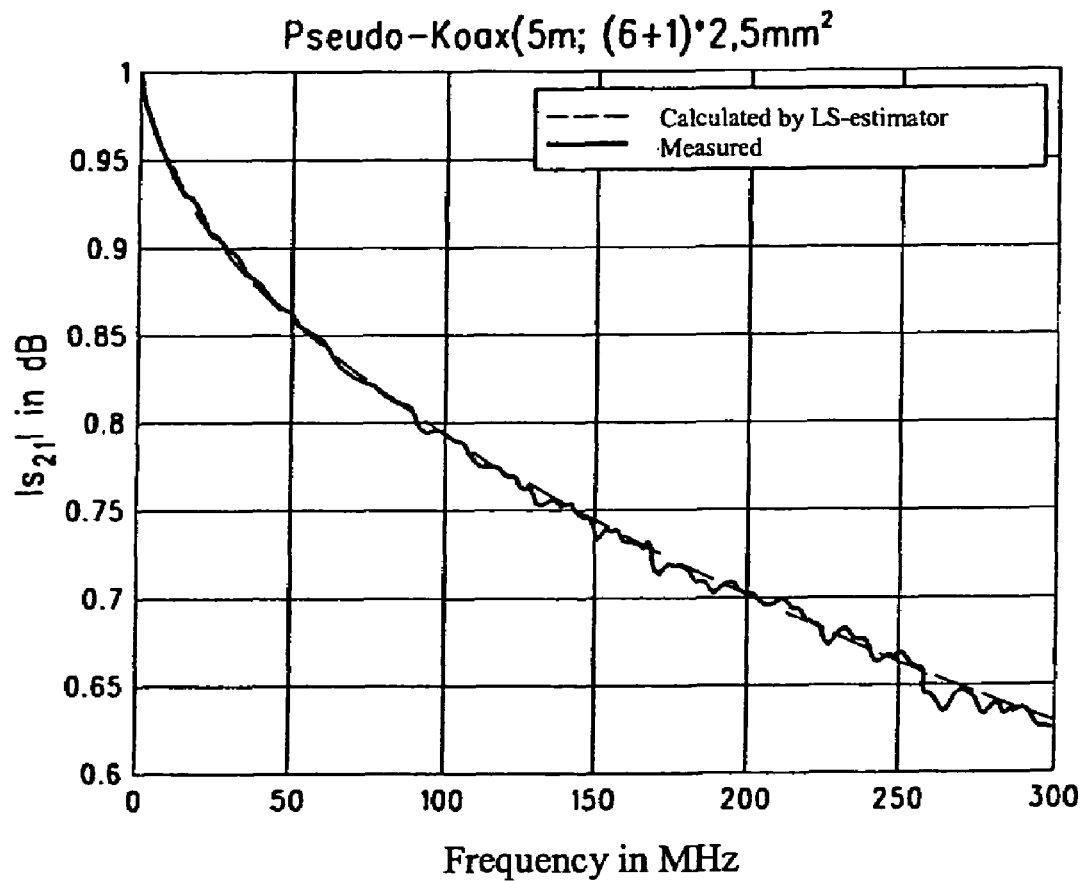
FIG. 7 shows the transmission characteristic of a 5-m-long supply line.

In order to verify the above statements, the transmission characteristic of a 5-m-long coaxial line arrangement having seven litz wires, each with the same cross-sectional area of 2.5 mm², were tested and modeled using the approximation equations given above. In so doing, $\varepsilon_r$=3.5 was used for dielectric constant $\varepsilon_r$, and tan δ=15*10⁻³ was used for the loss factor tan δ for copper. Characteristic impedance $Z_L$ was approximated according to Equation 1 as $Z_L$=40 Ω. The measurement itself was approximated at the reference impedance $Z_O$=40 Ω. However, the measurement itself was performed at the reference impedance $Z_O$=39 Ω. Finally, FIG. 7 shows the transmission function determined using measurement technology, as well as the modeled transmission function. The modeled transmission function was calculated based on the above relationships using a least-squares estimator. The excellent agreement of the measurement and the simulation is apparent.

What is claimed is:

1. A supply line structure, comprising:
   supply lines arranged in a star network topology and having at least one network star point, wherein at least a portion of the supply lines includes a coaxial arrangement of a plurality of outer litz wires disposed about a central litz wire; and
   capacitors by which the outer litz wires are short-circuited with respect to each other;
   wherein the supply line structure is arranged to supply energy to electrical components of an automobile vehicle and to transmit information between at least some of the electrical components.

2. The supply line structure as recited in claim 1, wherein the outer litz wires at both ends of at least one of the supply lines are short-circuited with respect to each other by the capacitors.

3. The supply line structure as recited in claim 1, wherein the central litz wire at both ends thereof is connected to a vehicle body.

4. The supply line structure as recited in claim 1, further comprising:
   an annular core including a ferritic material and through which at least one of the supply lines passes.

5. The supply line structure as recited in claim 4, wherein the at least one of the supply lines encircles the annular core at least one time.

6. The supply line structure as recited in claim 4, further comprising:
   a generator;
   wherein the at least one of the supply lines passes through the annular core on a side of the generator.

7. The supply line structure as recited in claim 1, wherein the outer litz wires includes five to ten outer litz wires.

8. The supply line structure as recited in claim 1, wherein the coaxial arrangement has a wave impedance of 35 to 50 ohms.

9. The supply line structure as recited in claim 1, wherein the coaxial arrangement has a transmission characteristic of −1.4 dB to −4.4 dB in a frequency range between 100 and 250 MHz.

10. The supply line structure as recited in claim 1, wherein the coaxial arrangement has a transmission characteristic of −1.9 dB to 3.7 dB in a frequency range between 100 and 250 MHz.

11. The supply line structure as recited in claim 1, wherein the supply line arrangement is arranged to transmit high frequency signals.

12. The supply line structure as recited in claim 1, wherein the capacitors include a capacitor between each pair of adjacent ones of the outer litz wires to short-circuit the wires of the respective pair with respect to each other.

* * * * *